United States Patent
Rama et al.

(10) Patent No.: US 12,553,772 B2
(45) Date of Patent: Feb. 17, 2026

(54) HIGH-RESOLUTION DEFOCUS COMPENSATING SPECTROGRAPH

(71) Applicant: Newport Corporation, Irvine, CA (US)

(72) Inventors: Jason Rama, Victor, NY (US); Nicole Naselaris, Rochester, NY (US)

(73) Assignee: Newport Corporation, Irvine, CA (US)

( * ) Notice: Subject to any disclaimer, the term of this patent is extended or adjusted under 35 U.S.C. 154(b) by 262 days.

(21) Appl. No.: 18/119,018

(22) Filed: Mar. 8, 2023

(65) Prior Publication Data

US 2024/0302212 A1    Sep. 12, 2024

(51) Int. Cl.
*G01J 3/32* (2006.01)
*G02B 5/32* (2006.01)

(52) U.S. Cl.
CPC . *G01J 3/32* (2013.01); *G02B 5/32* (2013.01)

(58) Field of Classification Search
CPC .................................... G01J 3/32; G01J 3/18
See application file for complete search history.

(56) References Cited

U.S. PATENT DOCUMENTS

| | | | | |
|---|---|---|---|---|
| 4,070,111 A * | 1/1978 | Harrick | ............... | G01J 3/2889 356/309 |
| 6,650,412 B1 | 11/2003 | Slater | | |
| 7,430,044 B2 | 9/2008 | Hagler | | |
| 7,579,601 B2 * | 8/2009 | Harrison | ............... | G01J 3/021 356/326 |
| 8,773,659 B2 | 7/2014 | McClure | | |
| 9,863,809 B2 | 1/2018 | Kuo et al. | | |
| 2005/0061969 A1 | 3/2005 | Greywall | | |
| 2007/0103679 A1 | 5/2007 | Yoo | | |
| 2012/0022819 A1 * | 1/2012 | Norton | ............... | G01J 3/28 356/334 |

(Continued)

FOREIGN PATENT DOCUMENTS

| | | | | |
|---|---|---|---|---|
| JP | 10253451 A | * | 9/1998 | ............... G01J 3/06 |
| KR | 1020200002894 A | | 1/2020 | |
| WO | WO-02057814 A2 | * | 7/2002 | ........... G02B 5/1866 |

OTHER PUBLICATIONS

D.G. Abdelsalam, "CCD or CMOS Camera Calibration Using Point Spread Function", 2014 (Year: 2014).*

(Continued)

*Primary Examiner* — Maurice C Smith
(74) *Attorney, Agent, or Firm* — Edward Scott Trask

(57) ABSTRACT

The present application discloses various embodiments of a high-resolution spectrograph. In one embodiment, the high-resolution spectrograph includes a light source, a housing, at least one adjustment device secured to the housing, and an optical detector secured to the adjustment device. At least one dispersive optical element is positioned in optical communication with the light source and the optical detector, wherein the dispersive optical element is configured to diffract at least a portion of an incident optical signal from the light source as a diffracted optical signal propagating toward the optical detector, wherein the optical detector is configured to measure at least one property at least one wavelength component of the diffracted optical signal. The adjustment device is configured to change the position of the optical detector relative to the dispersive optical element to optimize the image width of the wavelength component of the diffracted optical signal.

17 Claims, 13 Drawing Sheets

(56) References Cited

U.S. PATENT DOCUMENTS

2014/0125975 A1* 5/2014 Hsieh .................... G01J 3/32
356/300
2018/0231459 A1 8/2018 Karabchevsky
2019/0212255 A1 7/2019 Neil

OTHER PUBLICATIONS

International Search Report issued for PCT counterpart application No. PCT/US2024/017651 dated Jun. 24, 2024 (4 pages).
Written Opinion issued for PCT counterpart application No. PCT/US2024/017651 dated Jun. 24, 2024 (7 pages).
Jiang, AQ., Zang, KY., Tu, HT., et al., "Ultrahigh-resolution spectrometer based on 19 integrated gratings", Scientific Reports, 9:10211 (2019) pp. 1-7.

* cited by examiner

HIGH-RESOLUTION DEFOCUS COMPENSATING SPECTROGRAPH

BACKGROUND

Optical spectroscopy is the study of electromagnetic spectra (the wavelength composition of light) due to atomic and molecular interactions. Spectrographs and spectrometers are used for a variety of applications in the fields of physics, biology, and chemistry. One of the design tradeoffs for these instruments is the need for compact size (i.e., small "design footprint") versus optimizing the instrument's geometry for high spectral resolution, that generally requires a larger design footprint.

While prior art spectrographs have proven useful in the past, a number of shortcomings have been identified. For example, spectrographs with high spectral resolution have a large distance between the grating and the image location on the detector in order to get high spatial separation of adjacent wavelengths since diffraction angles of adjacent wavelengths can be very similar. However, such high separation of adjacent wavelengths generally requires a larger design footprint. Also, typical spectrograph module designs use a planar detector and can have only two wavelengths in the full spectrum for which the focus is fully optimized that is, image width is smallest. Hence, the entire spectrum is not able to be fully optimized for focus, and other wavelengths are not providing the greatest spectral resolution possible. In light of the foregoing, there is an ongoing need for an spectrograph that provides high resolution with a minimized design footprint.

SUMMARY

The present application discloses various embodiments of an optical instrument. In one embodiment, the optical instrument, comprises at least one housing, at least one adjustment device secured to the at least one housing, at least one detector secured to at least one adjustment device; and at least one dispersive optical element configured to receive an incident optical signal propagating along an incident optical axis ($A_I$) and diffract at least a portion of the incident optical signal as a diffracted optical signal propagating toward the at least one detector, wherein the at least one detector is configured to measure at least one property of the diffracted optical signal, wherein the at least one adjustment device is configured to change the position of the at least one detector relative to the at least one dispersive optical element. In various embodiments, the at least one adjustment device is a linear motion stage having a fixed portion secured to the housing and a movable portion secured to the at least one detector, wherein the movable portion of the at least one adjustment device is actuated by at least one actuator chosen from the group consisting of piezo actuators, servomotor actuators, stepper motor actuators, and linear motor actuators. The at least one adjustment device may also be configured to change the angular orientation of the at least one detector relative to the at least one dispersive optical element, wherein the at least one adjustment device is selected from the group consisting of optical mounts, tip-tilt platforms, gimballed platforms, goniometers, angular stages, and flexure mounts. In various embodiments, the at least one adjustment device is actuated by at least one actuator chosen from the group consisting of piezo actuators, servomotor actuators, stepper motor actuators, worm screw drives, and linear motor actuators. In other embodiments, the at least one dispersive optical element is secured to at least one adjustment device configured to change the position of the at least one dispersive optical element relative to at least one of the at least one detector or the incident optical signal. In other embodiments, the at least one dispersive optical element is secured to at least one adjustment device configured to change the angular orientation of the at least one dispersive optical element relative to at least one of the at least one detector or the incident optical signal. In one embodiment, the at least one dispersive optical element is a holographic grating having a groove profile selected from the group consisting of sinusoidal, trapeze, bump, cycloid, inverted cycloid, saw-tooth, and trapezoidal saw tooth profiles. In other embodiments, the at least one dispersive optical element is a diffraction grating selected from the group consisting of echelle gratings, replicated gratings, dual-blaze gratings, and mosaic gratings. In one embodiment, the at least one property of the diffracted optical signal is an image width (W) at least one wavelength component of the diffracted optical signal. The at least one property of the diffracted optical signal may also be an optical power of at least one wavelength component of the diffracted optical signal.

The present application also discloses various embodiments of a method of analyzing an incident optical signal. In one embodiment, the method comprises providing at least one dispersive optical element operative to reflect the incident optical signal as a diffracted optical signal, providing at least one detector configured to measure one or more properties of the diffracted optical signal, providing at least one adjustment device operative to change a position of the at least one detector relative to the at least one dispersive optical element, and providing at least one controller configured to receive measurement data representative of the one or more properties of the diffracted optical signal from the at least one detector, and to command the at least one adjustment device to position the at least one detector relative to the at least one dispersive optical element, followed by measuring, with the at least one detector, at least one of the one or more properties of the diffracted optical signal, and adjusting the position of the detector relative to the at least one dispersive optical element with the at least one adjustment device until an optimum value of the at least one of the one or more properties of the diffracted optical signal is reached. The properties of the diffracted optical signal measured by the method include an optical power of at least one first wavelength component ($\lambda_1$), at least one second wavelength component ($\lambda_2$), at least one third wavelength component ($\lambda_3$), at least one fourth wavelength component ($\lambda_4$), and at least one fifth wavelength component ($\lambda_5$).

In another embodiment, the method comprises providing at least one dispersive optical element operative to reflect the incident optical signal as a diffracted optical signal, providing at least one detector configured to measure one or more properties of the diffracted optical signal, wherein one of the one or more properties of the diffracted optical signal is an image width ($W_n$) of one or more wavelength components ($\lambda_n$), providing at least one adjustment device operative to change a position of the at least one detector relative to the at least one dispersive optical element, and providing at least one controller configured to receive measurement data representative of the image width ($W_n$) of a first wavelength component ($\lambda_1$) from the at least one detector, and to command the at least one adjustment device to adjust the position of the at least one detector relative to the at least one dispersive optical element. The steps of the method include executing a control sequence, comprising, in a first measurement step, measuring a first image width ($W_1$) of the first wavelength component ($\lambda_1$), with the at least one detector positioned at a first position ($P_1$) relative to the at least one dispersive optical element; in a first motion step, positioning, with the at least one adjustment device, the at least one detector at a second position ($P_0$) relative to the at least one dispersive optical element; in a second measurement step, measuring a second image width ($W_2$) of the first wavelength component ($\lambda_1$) with the at least one detector positioned at the second position ($P_0$) relative to at least one dispersive optical element; in a comparison step comparing, in the at least one controller, the first image width ($W_1$) to the second image width ($W_2$) to determine a first change in image width ($\Delta W_1$); if the first change in image width ($\Delta W_1$) is positive, in a third motion step, positioning, with the at least one adjustment device, the at least one detector an incremental step ($-\Delta P_1$) closer to the at least one dispersive optical element; if the first change in image width ($\Delta W_1$) is negative, in a second motion step, positioning, with the at least one adjustment device, the at least one detector the same incremental step ($-\Delta P_1$) closer to the at least one dispersive optical element. The control sequence steps above are iterated as required until a minimum image width ($W_{min}$) is reached, followed by outputting data representative of the minimum image width ($W_{min}$) to at least one display. The method further comprises repeating the control sequence for a second wavelength component ($\lambda 2$) at least one third wavelength component ($\lambda_3$), at least one fourth wavelength component ($\lambda_4$), and at least one fifth wavelength component ($\lambda_5$) of the diffracted optical signal.

In another embodiment, the method comprises providing at least one dispersive optical element operative to reflect the incident optical signal as a diffracted optical signal, providing at least one detector configured to measure one or more properties of the diffracted optical signal wherein one of the one or more properties of the diffracted optical signal is an image width ($W_n$) of one or more wavelength components ($\lambda_n$), providing an adjustment device operative to change a position of the at least one detector relative to the at least one dispersive optical element, providing at least one detector controller configured to receive measurement data representative of at least one property of the diffracted optical signal from the at least one detector, and providing at least one motion controller configured to command the at least one adjustment device to adjust the position of the at least one detector relative to the at least one dispersive optical element. A control sequence is executed, wherein the control sequence includes in a first measurement step, measuring, with the at least one detector positioned at a first position ($P_n$) relative to at least one dispersive optical element, a first image width ($W_n$) of a first wavelength component ($\lambda_1$); in a first data acquisition step, transmitting measurement data representative of the second image width ($W_n$) from the at least one detector to the at least one detector controller and transmitting detector data representative of the first position ($P_n$) relative to at least one adjustment device to the at least one motion controller; in a first motion step, positioning, with the adjustment device, the detector a first incremental step ($-\Delta P_n$) to a second position ($P_{n-1}$) relative to the at least one dispersive optical element; in a second measurement step, measuring, with the at least one detector positioned at the second position ($P_{n-1}$) relative to at least one dispersive optical element, a second image width ($W_{n+1}$) of the first wavelength component ($\lambda_1$); in a second data acquisition step, transmitting measurement data representative of the second image width ($W_{n+1}$) from the at least one detector to the at least one detector controller and transmitting detector position data representative of the second position ($P_{n-1}$) relative to the at least one adjustment device to the at least one motion controller; in a second motion step, positioning, with the at least one adjustment device, the at least one detector a second incremental step ($-\Delta P_n$) to a third position ($P_{n-2}$) relative to the at least one dispersive optical element; in a third measurement step, measuring, with the at least one detector positioned at the third position ($P_{n-2}$) relative to the at least one dispersive optical element, a second image width ($W_{n+2}$) of the first wavelength component ($\lambda_1$); in a third data acquisition step, transmitting measurement data representative of the third image width ($W_{n+2}$) from the at least one detector to the at least one detector controller and transmitting detector position data representative of the third position ($P_{n-2}$) of the at least one detector relative to the at least one adjustment device to the at least one motion controller; in a compilation step, compiling in at least one controller the image width data and the detector position data from sequential data acquisition steps, and selecting a smallest image width ($W_{min}$) of the compiled image width data; positioning the at least one detector at a position ($P_{min}$) associated with the smallest image width ($W_{min}$). The method further comprises repeating the control sequence for a second wavelength component ($\lambda_2$) at least one third wavelength component ($\lambda_3$), at least one fourth wavelength component ($\lambda_4$), and at least one fifth wavelength component ($\lambda_5$) of the diffracted optical signal.

BRIEF DESCRIPTION OF THE DRAWINGS

Various embodiments of a high-resolution spectrograph will be explained in more detail by way of the accompanying drawings, wherein.

DETAILED DESCRIPTION

Figure 1:
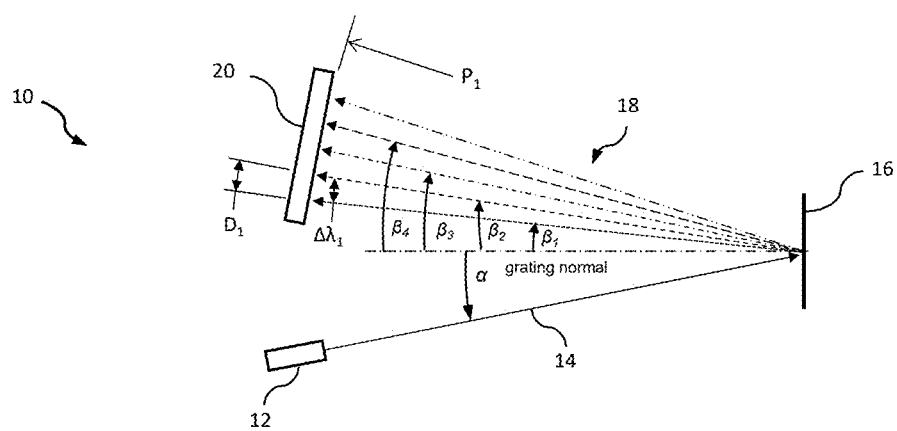
FIGS. 1 and 2 show optical schematics showing the effects of different positions of an optical detector relative to a dispersive optical element.

Example embodiments are described herein with reference to the accompanying drawings. Unless otherwise expressly stated, in the drawings the sizes, positions, etc., of components, features, elements, etc., as well as any distances therebetween, are not necessarily to scale, and may be exaggerated for clarity. In the drawings, like numbers refer to like elements throughout. Thus, the same or similar numbers may be described with reference to other drawings even if they are neither mentioned nor described in the corresponding drawing. Also, even elements that are not denoted by reference numbers may be described with reference to other drawings.

The terminology used herein is for the purpose of describing particular exemplary embodiments only and is not intended to be limiting. Unless otherwise defined, all terms (including technical and scientific terms) used herein have the same meaning as commonly understood by one of ordinary skill in the art. As used herein, the singular forms "a," "an" and "the" are intended to include the plural forms as well, unless the context clearly indicates otherwise. Also, the terms "at least one", "at least a", and "one or more" may are intended to include both the singular and plural forms, depending on the context. It should be recognized that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Unless indicated otherwise, terms such as "first," "second," etc., are only used to distinguish one element from another. For example, one coupler could be termed a "first coupler" and similarly, another coupler could be termed a "second coupler", or vice versa.

Unless indicated otherwise, spatially relative terms, such as "below," "beneath," "lower," "above," and "upper," "opposing," and the like, may be used herein for ease of description to describe one element or feature's relationship to another element or feature, as illustrated in the FIGS. It should be recognized that the spatially relative terms are intended to encompass different orientations in addition to the orientation depicted in the FIGS. For example, if an object in the FIGS. is turned over, elements described as "below" or "beneath" other elements or features would then be oriented "above" the other elements or features. Thus, the exemplary term "below" can encompass both an orientation of above and below. An object may be otherwise oriented (e.g., rotated 90 degrees or at other orientations) and the spatially relative descriptors used herein may be interpreted accordingly. A set of reference axes (e.g., X, Y, Z), directions, or coordinates, and the rotation around them (e.g., ex, BY, OZ) may be included in the FIGS. for the purpose of orienting the reader to facilitate understanding of the FIGS. and the specification, and do not necessarily indicate that any particular feature or element is aligned with, or is orthogonal to, any other feature or element.

The paragraph numbers used herein are for organizational purposes only, and, unless explicitly stated otherwise, are not to be construed as limiting the subject matter described. It will be appreciated that many different forms, embodiments and combinations are possible without deviating from the spirit and teachings of this disclosure and so this disclosure should not be construed as limited to the example embodiments set forth herein. Rather, these examples and embodiments are provided so that this disclosure will be thorough and complete, and will convey the scope of the disclosure to those skilled in the art.

The embodiments described below relate to spectrographs and spectrometers, both of which separate and measure spectral components of a physical phenomenon. Spectrometer is a broad term often used to describe instruments that measure a continuous variable of a phenomenon where the spectral components are somehow mixed. It works by splitting light into its individual wavelengths using a dispersive device and measuring the intensity of each one with one or more optical sensors or detectors. A spectrograph is an instrument that separates light by its wavelengths and records this data. A spectrograph typically has an optical detector, multi-channel optical detector, optical detector array, optical sensor, or camera that detects and records the spectrum of light. Spectrometers and spectrographs differ in how they measure and display the results. The resulting data is presented as a graph showing the intensity of light as a function of wavelength, which is called a spectrum. Operators of spectrometers and spectrographs often test samples to understand the behavior of those samples at a particular wavelength (also referred to herein as "a wavelength of interest") or multiple wavelengths (also referred to herein as "wavelengths of interest"). In similar fashion, specific spectra or sub-spectra may be referred to herein as "the spectra" or "the sub-spectra" of interest. Two important properties of spectrographs are dispersion and angular resolution. Dispersion sets the wavelength range of the spectrum, and the spectral resolution sets the size of the smallest spectral features that can be studied in the spectrum. When optical gratings are used as the dispersive device, dispersion and spectral resolution are governed by the grating equation, $m\lambda = d(\sin \alpha + \sin \beta)$, that governs the angular locations of the principal intensity maxima when light of wavelength $\lambda$ is diffracted from a grating of groove spacing d, wherein m is the diffraction order (an integer), $\alpha$ (alpha) is the angle of incidence, and $\beta$ (beta) is the diffraction angle, wherein both $\alpha$ and $\beta$ are measured with respect to grating normal. Angular dispersion is defined as the rate of change of the diffraction angle $\beta$ of dispersed light with wavelength $\lambda$. Spectral resolution (denoted as SR for the purposes of this disclosure) of a spectrograph is the ability to distinguish between two wavelengths separated by an amount $\Delta\lambda$, either expressed in nanometers or as a dimensionless quantity $SR = \lambda/\Delta\lambda$.

For the purposes of clarity of this disclosure, the following positioning notations will be used. Positions of components, objects, or features are denoted as $P_n$, with an object at $P_n$ being considered to be at one position relative to another object, and an object at a position $P_{n-1}$ can be considered to be at a second position (closer) to the same object or feature. For example, as used the paragraphs below, if a detector is at position $P_2$ relative to a dispersive optical element (e.g., a grating), the same detector at position $P_1$ relative to the grating is closer to the grating. Incremental movements or steps denoted as $-\Delta P_n$ indicate that components, objects, or features are moved closer to each other by a certain amount ($\Delta P$), and incremental movements or steps $+\Delta P_n$ indicate that components, objects, or features are moved away from each other by the same amount ($\Delta P$). It follows that if the detector is moving in the "+P direction" relative to the grating, the detector is moving away from the grating, and if the detector is moving in the "−P direction" relative to the grating, the detector is moving toward the grating.

The embodiments described below relate to the improvement of the resolution of a spectrometer or spectrograph by adjusting the position of an optical detector (or the position of a dispersive optical element) from a location of suboptimal focus (also referred to herein as "defocus") of individual wavelength components of a diffracted optical signal to the location of optimum focus of those wavelength components at the optical detector relative to the position of the dispersive optical element. Defocus of individual wavelength components can be caused by a variety of optical aberration effects (e.g., astigmatism, field curvature, and the like or combination thereof). The aberration effects generally affect different wavelengths differently, so the location of optimum focus relative to the dispersive optical element can be different for different wavelengths. A spectrograph having the capability to correct for defocus effects can be described as "defocus-compensated", or as having a "defocus-compensation feature". Such a defocus-compensation feature may be turned on (i.e., "enabled") or turned off (i.e., "disabled") by the operator or by operation of the controller of the spectrograph.

Figure 2:
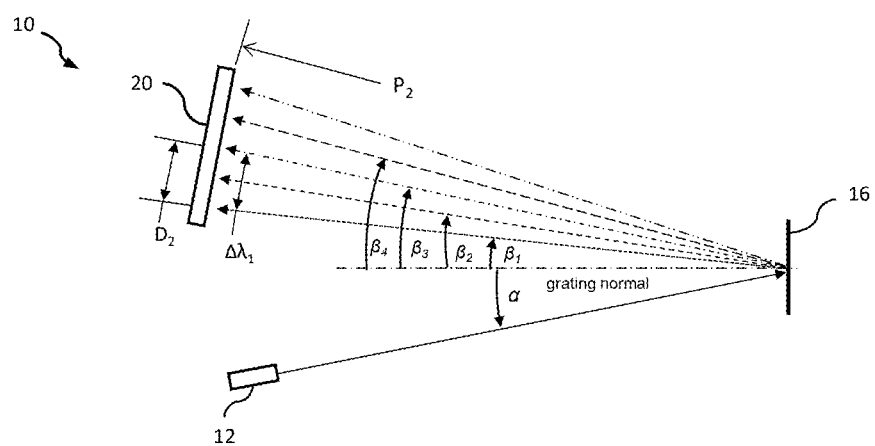

FIGS. 1 and 2 show optical schematics of a spectrograph 10 configured to measure properties of optical signals from a source 12. In FIG. 1, the spectrograph 10, an optical signal 14 propagating from the source 12 is incident on a dispersive optical element 16 (e.g., the diffraction grating 16) and is diffracted as a diffracted optical signal 18 to a detector 20 positioned at a position $P_1$ relative to the grating 16. The diffracted optical signal 18 shows separate rays having different wavelengths (also referred to herein as "wavelength components") propagating at different angles $\beta_{1,2,3,4}$ in the first diffraction order. When adjacent wavelength components reach the detector 20, they are separated from each other by a change in wavelength $\Delta\lambda_1$. For example, the lower two wavelength components may have wavelengths of $\lambda_1$ (e.g., 450 nm) and $\lambda_2$ (e.g., 480 nm), thereby having a $\Delta\lambda_1$ of 30 nanometers. The distance between the incident points of these two wavelength components at the detector plane is shown as $D_1$. In FIG. 2, the spectrograph 10 has the detector 20 positioned at a position $P_2$ that is further from the grating 16 than at position $P_1$. By virtue of the detector 20 being further from the grating 16, the wavelength components of the diffracted optical signal 18 that are separated by the same change in wavelength $\Delta\lambda_1$ are spatially separated by a larger distance, $D_2$, at their relative incident points on the detector 20.

Figure 3:
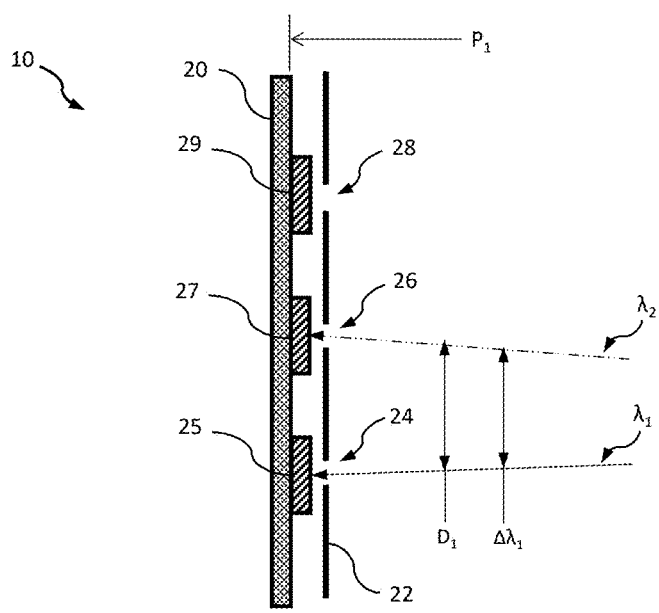
FIGS. 3 and 4 show portions of optical schematics of FIGS. 1 and 2, respectively, showing separated wavelength components incident on an optical detector.
Figure 4:
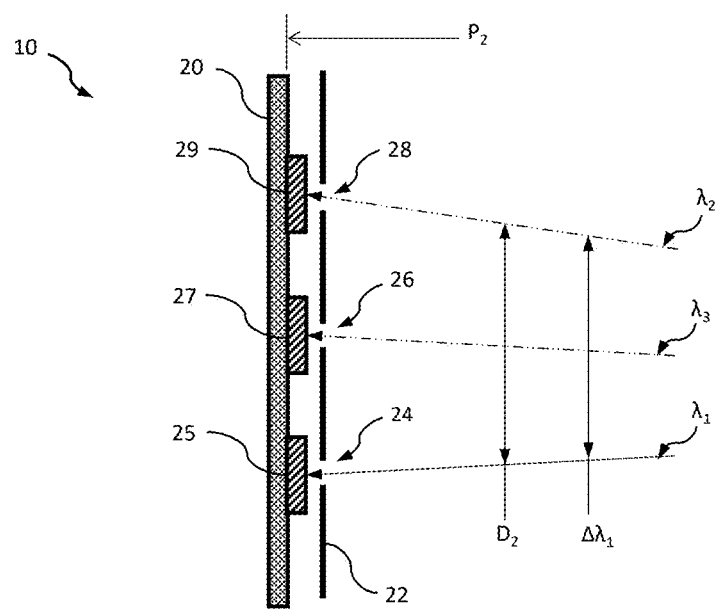

FIGS. 3 and 4 show the detector 20 of the spectrograph 10 including a mask 22 having a plurality of slits 24, 26, and 28 positioned in front of corresponding detector elements 25, 27, and 29, respectively, of the detector 20. FIG. 3 shows that with the detector 20 positioned at the position $P_1$ from the grating 16 shown in FIG. 1, the wavelength separation $\Delta\lambda_1$ results in the physical separation of $D_1$, enabling detection of wavelength components $\lambda_1$ (e.g., 450 nm) propagating through slit 24 to detector element 25, and $\lambda_2$ (e.g., 480 nm) propagating through slit 26 to detector element 27. FIG. 4 shows that with the detector 20 positioned at position $P_2$ further from the grating 16 than shown in FIG. 1, so the wavelength separation $\Delta\lambda_1$ results in a physical separation of $D_2$ between the wavelength components $\lambda_1$ and $\lambda_2$, enabling detection of a third wavelength component $\lambda_3$ (e.g., 465 nm) propagating through slit 26 to detector element 27, while the wavelength component $\lambda_2$ propagates through slit 28 to detector element 29. As such, positioning the detector 20 at position $P_2$ further away from the grating 16 enables enhanced resolution of the instrument 10.

Figure 5:
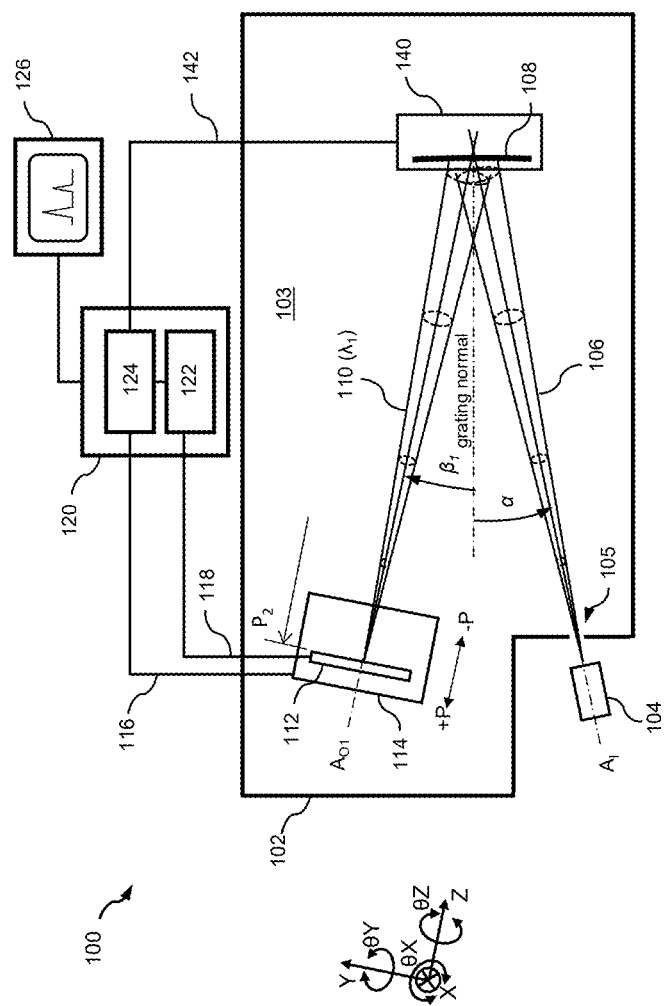
FIG. 5 shows a schematic of an embodiment of a high-resolution spectrograph having an optical detector in a first position for measurement of a first wavelength component of a diffracted optical signal.
Figure 6:
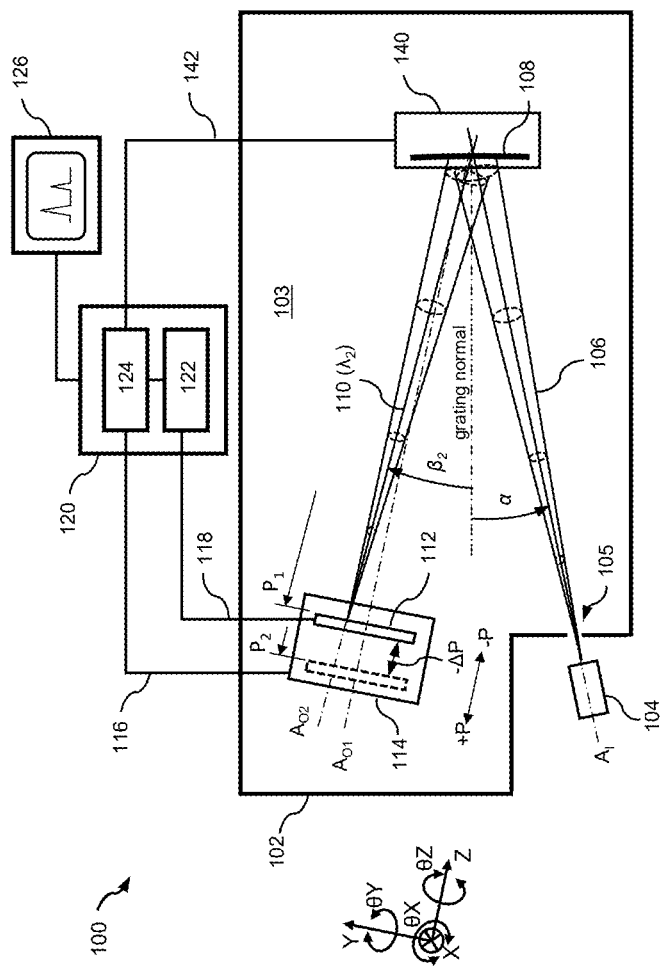
FIG. 6 shows a schematic of the embodiment of the high-resolution spectrograph shown in FIG. 5 with an optical detector in a second position for measurement of second wavelength component of a diffracted optical signal.

FIGS. 5 and 6 show optical schematics of an embodiment of an optical instrument 100 (e.g., a high-resolution spectrograph 100) that is configured to compensate for the defocus effects of diffracted light in the first diffraction order for two wavelength components ($\lambda_1$ & $\lambda_2$), respectively. A coordinate reference is provided in FIGS. 5 and 6, showing X, Y, Z axes (or directions) and ɵx, ɵY and ɵZ rotations around these axes. Generally speaking the "Z direction" refers to movement along an optical axis (e.g., an optical axis of a wavelength component of a diffracted optical signal, or in a direction optically upstream or downstream along the direction of propagation of a wavelength component). In FIG. 5, the Z axis is aligned with a specific optical axis $A_{O1}$ (e.g., that the wavelength component $\lambda_1$ propagates along). In various embodiments, the spectrograph 100 may have sufficient resolution to measure finely divided wavelength components $\lambda_1$=450.00 nm, $\lambda_2$=450.15 nm, $\lambda_3$=450.45 nm, $\lambda_4$=450.60 nm, and so on.

As shown in FIG. 5, in the illustrated embodiment, the spectrograph 100 includes at least one housing 102 having at least one interior volume 103, at least one entrance port 105 formed in the housing 102, at least one dispersive optical element 108 (also referred to herein as "the grating 108"), at least one optical sensor or detector 112, and at least one adjustment device 114, all positioned in or secured to various parts of the housing 102. The spectrograph 100 further includes an instrument controller 120 (also referred to herein as "the controller 120") having a detector controller 122 in electrical communication with the detector 112 via a conduit 118 and a motion controller 124 in electrical communication with the adjustment device 114 and the adjustment device 140 via conduits 116 and 142, respectively. At least one display 126 in electrical communication with the instrument controller 120 is provided to display the measurement results of the spectrograph 100. In various embodiments, the detector 112 can include a variety of slits configured to differentiate between the wavelength components being measured. The slits may have widths ranging from 5 microns to 500 microns, though those skilled in the art will appreciate that the slits may be any size.

At least one source 104 emits at least one incident optical signal 106 propagating through the entrance port 105 along an incident optical axis $A_I$ incident on the grating 108 at an incident angle α (alpha) relative to grating normal. The grating 108 diffracts the incident optical signal 106 as a diffracted optical signal 110 having one or more (or a plurality of) wavelength components, wherein each wavelength component $\lambda_n$ propagates at an angle $\beta_n$ relative to grating normal toward the detector 112, wherein the angle $\beta_n$ is determined by the surface morphology (e.g., groove spacing or groove profile) of the grating 108 when the grating 108 is provided as a reflective grating. For example, a first wavelength component having a wavelength $\lambda_1$ is considered to be diffracted at an angle $\beta_1$ relative to grating normal (e.g., based on the surface morphology of the grating 108), and propagates along a diffracted optical axis $A_{O1}$ to the detector 112, as shown in FIG. 1. For the sake of simplicity, the source 104 is shown as a point source emitting the incident optical signal 106. In various embodiments, the source 104 can be any variety of objects that emit or reflect polychromatic light that can be analyzed by the spectrograph 100. For example, in one embodiment, the sample is a biological sample that is illuminated by a broadband light source (not shown) such that light (e.g., the incident optical signal 106) reflected from such a sample propagates through the entrance port 105 along the incident optical axis $A_I$. In another embodiment, the source 104 may be a light source such as an LED that emits light at multiple wavelengths. In another embodiment, the source 104 is an optical fiber in optical communication with a sample or light source. The spectrograph 100 may include an aperture or entrance slit (not shown) mounted on the entrance port 105 that limits the amount of light or the wavelengths of light from the source 104 allowed to propagate to the grating 108. In the illustrated embodiment, the housing 102 is pneumatically sealed except for one or more filters configured to prevent particulate contaminants from entering the housing 102 into the interior volume 103. In other embodiments, the housing 102 is pneumatically sealed and a gas (e.g., an inert gas) is introduced to the interior volume 103. Those skilled in the art will appreciate that the housing may be configured in any way to control the environment in the interior volume 103.

While the embodiments of the spectrograph 100 described with respect to FIGS. 5 and 6 measures wavelength components in the first diffraction order, those skilled in the art will appreciate that the spectrograph 100 may be used to measure wavelength components in higher diffraction orders or in negative diffraction orders. The incident optical signal 106 is shown as a diverging beam for the purpose of showing how the dispersive optical element 108 (when provided as a concave grating) focuses each wavelength component (shown as a converging beam) of the diffracted optical signal 110 relative to the detector 112. In the illustrated embodiment, the grating 108 is a concave holographic grating. Those skilled in the art will appreciate that the grating 108 may be provided as any type of dispersive element, including diffraction gratings such as ruled gratings, echelle gratings (single-blaze or multi-blaze), mosaic gratings, holographic gratings, and replicated gratings made therefrom. When provided as a holographic grating, the groove profile can be any type of profile, including sinusoidal, trapeze, bump, cycloid, inverted cycloid, saw-tooth, or trapezoidal sawtooth profiles. The dispersive surface of the grating 108 may be planar, convex, concave, or any shape or variety of morphology. In some embodiments, the grating surfaces can be coated with dielectric materials (e.g., metal oxides such as silicon dioxide ($SiO_2$) or magnesium fluoride ($MgF_2$), in single layers or multiple alternating layers or combinations thereof), at least in part to protect the grating surface in applications involving high laser fluence at the grating surface. The grating surfaces can also be coated with a variety of metals (e.g., metals, such as aluminum, gold, silver, and the like). Those skilled in the art will appreciate that the grating surfaces may be coating with any variety of materials. The dispersive optical element 108 may also be provided as a transmission grating, prism, or pair of prisms. In other embodiments, multiple dispersive elements may be used.

The detector 112 is configured to detect or measure one or more optical properties of the diffracted optical signal 110 or of individual wavelength components of the diffracted optical signal 110 (include, without limitation, optical power, optical image width, optical image profile, beam profile, laser fluence, number of photons, wavelength, spectrum, sub-spectrum, multiple spectra or sub-spectra, or the like or any combination thereof) and transmit measurement data representative of such optical properties to the detector controller 122. In the illustrated embodiment, the detector 112 is provided as a wavelength-agnostic detector configured to measure the optical power of the wavelength components of the diffracted optical signal 110 focused thereon or allowed to propagate thereto. The detector 112 may include multiple detector elements (not shown), wherein each detector element is configured to measure at least one wavelength component of the diffracted optical signal 110. The detector 112 also may be provided as a detector array or photon counter.

The spectrograph 100 may be configured to operate over a variety of optical powers, wavelength ranges or number of wavelength ranges, depending on the type of source 104, the dispersive optical element 108, the detector 112, or adjustment device 114 used. Examples of wavelength ranges include UV (extreme UV, vacuum UV, deep UV, visible, near infrared, mid-infrared, and far infrared. The spectrograph 100 may also be reconfigurable by replacing any of the aforementioned components with others configured to operate at different powers, wavelengths, etc.

Examples of sensor/detector types that may be incorporated into the spectrograph 100 include photodiodes (PD, avalanche photodiodes (APD), phototransistors, photodiode arrays, charge coupled devices (CCD), PIN diodes, CMOS sensors, and the like. In the illustrated embodiment, the detector 112 is a Silicon (Si) detector having a wavelength responsivity range from about 190 nanometers to about 1100 nanometers. Detector materials (and their approximate responsivity ranges) that can be used as the detector 112 include, without limitation, Silicon (Si) VUV detectors (193 nm), Si RGB color sensors (blue 400-450 nm, green 470-600 nm, and red 590-720 nm), Gallium Nitride (GaN, 362-375 nm), Gallium Arsenide Phosphide (GaAsP, 430-690 nm), Germanium (Ge, 800-1800 nm), Indium arsenide (InAs, 1000-3800 nm), Indium Gallium Arsenide (InGaAs, 900-1700 nm), Extended Range InGaAs (900-2500 nm), Gallium Arsenide (GaAs, 900-1700 nm), Lead Sulfide (PbS, 1000-1300 nm), Mercury Cadmium Telluride (HgCdTe, 2000-26000 nm), detectors. Along with the detector types and materials listed above, there are many varieties tailored to operate at specific wavelengths or wavelength ranges. Those skilled in the art will appreciate that any of this wide variety of detectors with any variety of wavelength responsivity ranges may be used. The detector 112 may be coated with a variety of thin film or nanotextured coatings as required for performance at any of the wavelength ranges listed above.

In various embodiments, the adjustment device 114 is configured to change the orientation of the detector 112 relative to the grating 108 or the diffracted optical signal 110, in the X, Y, Z, ΘX, ΘY, or ΘZ directions, rotations, or degrees of freedom. The adjustment device 114 is also capable of compound positioning (e.g., simultaneous changes in orientation in the X and ΘX degrees of freedom, or in the X-direction and Z-direction) of the detector 112. The center, pivot point or pivot axis of the rotational degrees of freedom ΘX, ΘY, or ΘZ may overlap or not overlap any of the surfaces of the detector 112. In one embodiment, the adjustment device 114 may change the orientation of the detector 112 by translating the detector 112 in a −P direction from a first position $P_n$ to a second position $P_{n-1}$ relative to the grating 108 (i.e., in an optically upstream direction), or from the first position $P_n$ in a +P direction to a second position $P_{n+1}$ relative to the grating 108 (i.e., in an optically downstream direction) away from the grating 108. The adjustment device 114 may be commanded by the detector controller 122 to move the detector 112 in increments of position, such as an increment −ΔP toward the grating 108, or as an increment +ΔP away from the grating 108. Because different wavelength components propagate in slightly different directions or along different optical axes, the Z axis or Z-direction as shown in FIGS. 5 and 6 may not align with all of the directions of propagation of wavelength components of the diffracted optical signal 110

The adjustment device 114 is secured to the structure of the housing 102, and the detector 112 is secured to the adjustment device 114. In one embodiment, the adjustment device 114 is configured to change the position of the detector 112 relative to the grating 108 or relative to any of the wavelength components of the diffracted optical signal 110. When configured as such, the adjustment device 114 would change the position of the detector 112 by positioning it along the optical axis of any wavelength component of the diffracted optical signal 110, (e.g., at a given position $P_n$ relative to the grating 108) either in an optically upstream direction (e.g., in a −P direction toward the grating 108) or in an optically downstream direction (e.g., in a +P direction away from the grating 108). In addition, the adjustment device 114 may change the position of the detector 112 transversely relative to the optical axis of any wavelength component of the diffracted optical signal 110. In the illustrated embodiment, the grating 108 is secured to an adjustment device 140 configured to change the position or orientation of the grating 108 relative to at least one of the source 104, the incident optical signal 106 or the detector 112. In another embodiment, the grating 108 is secured to the housing 102 and therefore not be configured to be moved or adjusted.

During operation of the spectrograph 100, the motion controller 124 is configured to send commands to the adjustment device 114 to change the position of the detector 112 in response to those commands, and/or to send commands to the adjustment device 140 to change the position of the grating 108 in response to those commands. For example, the adjustment device 114 may be commanded by the motion controller 124 to move the detector 112 in increments of position, such as an increment −ΔP toward the grating 108, or as an increment +ΔP away from the grating 108. The adjustment device 114 is configured to transmit data representative of the position (P) of the detector 112 relative to the grating 108 to the motion controller 124 as required for control of the spectrograph 100. The controller 120 can include any of a variety of processors or calculation modules configured to execute the functions of the spectrograph 100. In addition, the structure and functions of the detector controller 122 and the motion controller 124 may be located and performed elsewhere in the controller 120, or may be distributed to the adjustment device 114 and/or the adjustment device 140. Data from the detector 112, the adjustment device 114, the adjustment device 140 may be communicated wirelessly to the controller 120, detector controller 122, or the motion controller 124, wirelessly. In some embodiments, spectrograph 100 may be integrated into a variety of other instruments (e.g., a spectrometer) as a spectrograph module. In some embodiments, the adjustment device 114 or adjustment device 140 may be configured to adjust position of the detector 112 or the grating 108 in response to changes in temperature of components of the spectrograph 100 (e.g., to compensate for movement of the components of the spectrograph 100 due to the different coefficients of thermal expansion of those components).

While the grating 108 diffracts the incident optical signal 106 into multiple wavelength components, FIG. 5 shows only one wavelength component of the diffracted optical signal 110 (at the first wavelength of interest $\lambda_1$), propagating along a first diffracted optical axis $A_{O1}$ at a first diffraction angle $\beta_1$ relative to grating normal and focused at a first incident point on the detector 112 (e.g., incident on a detector element (not shown)) when the grating is positioned at a position $P_2$ relative to grating 108). The diffracted optical signal 110 at $\lambda_1$ is focused by the grating 108 to a first image having a first image width $W_1$ at the surface of the detector 112. While in this embodiment the grating 108 is shown as a concave grating that focuses each wavelength component at the detector 112, the grating 108 can alternatively be provided as a planar grating, and a focusing element (such as a lens) can be placed between the planar grating to focus each wavelength component at the detector 112. In some embodiments, in order to increase the physical separation of the wavelength components while minimizing the design footprint of the spectrograph 100, the diffracted optical signal 110 may be routed to one or more mirrors (planar, concave, or convex) configured to reflect the diffracted optical signal 110 from the grating 108 to the detector 112.

FIG. 6 shows the same incident optical signal 106 propagating from the source 104 to the grating 108 that diffracts the incident optical signal 106 as a diffracted optical signal 110 at a second wavelength of interest $\lambda_2$ (i.e., a wavelength component having wavelength $\lambda_2$) propagating along a second diffracted optical axis $A_{O2}$ at a second diffraction angle $\beta_2$ relative to grating normal and focused on the detector 112 at a second incident point (e.g., a detector element (not shown)). For the sake of clarity, FIG. 6 shows only the second wavelength component $\lambda_2$ of the diffracted optical signal 110. The second wavelength component $\lambda_2$ is focused at the plane of the detector 112 to a second image having a second image width $W_2$. In this embodiment, due to a variety of optical aberration effects (e.g., astigmatism, field curvature, and defocus) the location of optimum focus of the second wavelength component $\lambda_2$ (i.e., where the second image $W_2$ is smallest) is located closer (at a position $P_1$) relative to the grating 108 than the location of optimum focus of the first wavelength component $\lambda_1$. If the detector 112 were to remain at position $P_2$ shown in FIG. 5, the second wavelength component $\lambda_2$ would not be properly focused (i.e., second image would be defocused, and, therefor larger). To minimize or compensate for the defocus of the second wavelength component $\lambda_2$, (and minimize the second image width $W_2$) the adjustment device 114 changes the position of the detector 112 an incremental step of ΔP to the position $P_1$ relative to grating 108, where the image width of the wavelength component $\lambda_2$ is smallest. Because the wavelength component $\lambda_2$ of the diffracted optical signal 110 propagates along an optical axis $A_{O2}$, at a larger angle 32, the adjustment device 114 changes the position of the detector 112 both toward the grating 108 in the −P direction (optically upstream) and laterally with respect to the −P direction so that the detector 112 will receive the wavelength component $\lambda_2$ propagating along the optical axis $A_{O2}$. Those skilled in the art will appreciate that the adjustment device 114 may move the detector 112 in a variety of directions in order to optimize the performance of the spectrograph 100.

Figure 7A:
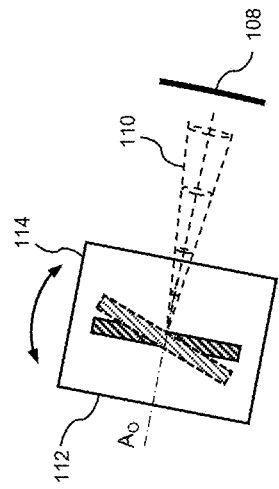
FIGS. 7A-7D show various views of changes in the position of the optical detector of the high-resolution spectrograph shown in FIGS. 5 and 6.
Figure 7B:
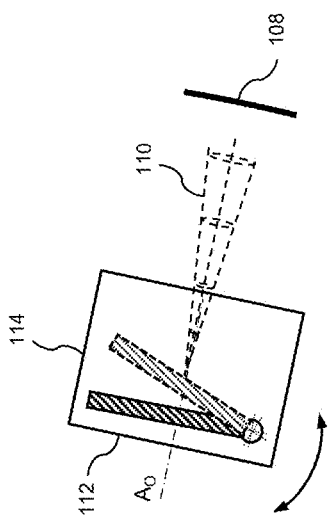
Figure 7C:
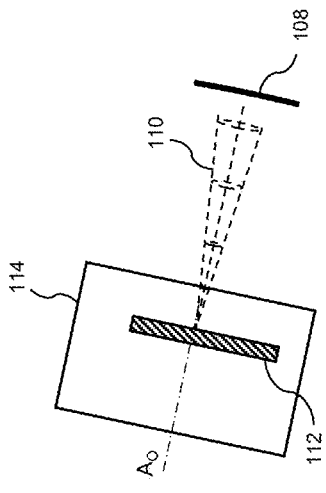
Figure 7D:
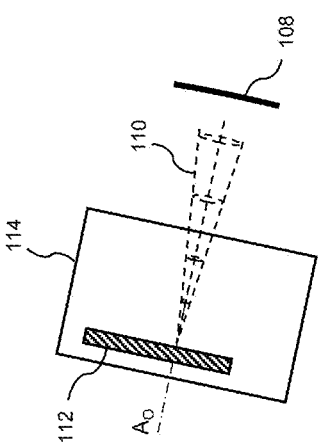

FIGS. 7A-7D show schematics of the adjustment device 114 adjusting the position of the detector 112 with respect to the grating 108 or the one or more wavelength components of the diffracted optical signal 110 in a variety of directions, along or around a variety of axes, or in different degrees of freedom. FIG. 7A shows the detector 112 pivoted by the adjustment device 114 around a pivot point that is located at the edge of the detector 112. FIG. 7B shows the detector 112 pivoted by the adjustment device 114 around a pivot point that is at the surface of the detector 112. FIGS. 7C and 7D show the detector 112 at a first position and a second position, wherein the detector 112 has been moved both along the optical axis $A_O$ and laterally with respect to the optical axis $A_O$ of the wavelength component being measured. Those skilled in the art will appreciate that the adjustment device 114 can position the detector 112 in any of a variety of ways for desired performance of the spectrograph 100.

To change the position of the detector 112 relative to the grating 108 (or to change the position of the grating 108 relative to the detector 112), the adjustment device 114 (or the adjustment device 140) may be provided as a motion stage having a fixed portion and a movable portion, wherein the grating 108 is secured to the movable portion, and the movable portion is driven by an actuator. For the For the purpose of this disclosure, the phrase "the detector 112 is secured to the adjustment device 114" means that the detector 112 is secured to the movable portion of the adjustment device 114 so that the detector 112 position can be changed by the adjustment device 114. Exemplary motion stages include, without limitation, linear stages, screw drive linear stages, manual linear stages, vertical stages, vertical positioners, and the like or any combination thereof. These motion stages may be driven by a variety of actuators, including without limitation, linear motors, servomotors, stepper motors, electrostrictive actuators, piezoelectric drivers, and the like or any combination thereof. The adjustment device 114 may move the detector in an open loop manner or in a closed loop manner (e.g., based on optical feedback, encoder feedback, or by counting the number of steps (in the case of a stepper motor)). Alternatively, the adjustment device 114 can be a manually driven linear stage (e.g., by a screw or micrometer) or other manual linear actuator.

In some embodiments, the adjustment device 114 can be configured to change the angular orientation of the detector 112 (e.g., in pitch, roll or yaw, or a combination thereof) relative to the grating 108. Likewise, the adjustment device 140 can be configured to change the angular orientation of the grating 108 (e.g., in pitch, roll or yaw, or a combination thereof) relative to the incident optical signal 106 or the detector 112. When the adjustment devices 114 and/or 140 are configured to change the angular orientation of the detector 112 or the grating 108, respectively, the adjustment devices 114, 140 may be provided as optical mounts, optic rotation mounts, goniometric stages, tip-tilt platforms, rotation stages, gimballed optical mounts, hexapods, or the like or any combination thereof. The adjustment devices could all be driven by the actuators listed above with respect to linear adjustment devices. In other embodiments, the adjustment devices 114, 140 may be provided as multiple motion stages or optical mounts connected to each other so that the position and the angular orientation of the detector 112 and/or the grating 108 can be adjusted simultaneously.

Figure 8:
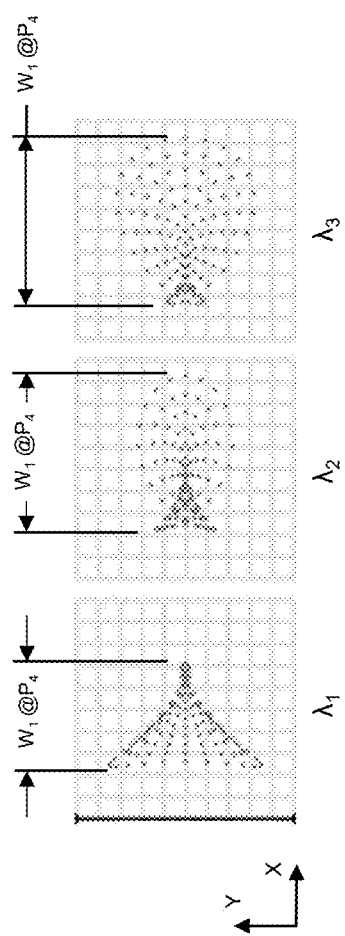
FIG. 8 shows image width plots for three wavelength components measured by the embodiment of the spectrograph shown in FIGS. 5 and 6 without defocus compensation.
Figure 9:
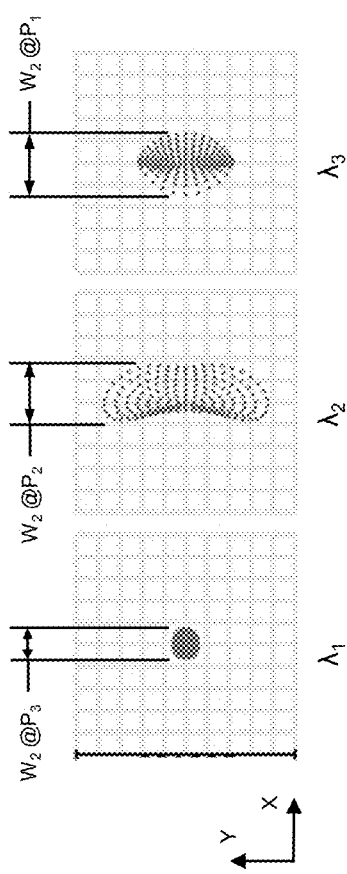
FIG. 9 shows image width plots for three wavelength components measured by the embodiment of the high-resolution spectrograph shown in FIGS. 5 and 6 with defocus compensation.

FIGS. 8 and 9 show example image plane spot diagrams for uncompensated spectrograph and defocus-compensated spectrograph configurations for three example wavelengths of interest (or wavelength components) ($\lambda_1$=380 nm, $\lambda_2$=730 nm, and $\lambda_3$=1,080 nm). Spot diagrams show the size and shape of an image formed at the specific field and wavelength point (e.g., where each spot is the result of at least one ray at one of the wavelengths of interest landing on the detector). The area where all of the spots are integrated to become the image size, W. In the illustrated embodiment of the spectrograph 100, the detector 112 uses a mask with slits oriented in the Y direction, so the image size in the X-direction (i.e., "image width") is used to quantify the spectral resolution of the spectrograph 100. The 10×10 square grids shown are a total of 300 microns wide, with ten divisions, so each square corresponds to 30 microns. As such, the term "image width" will be used to denote the size of the image in the X direction. Those skilled in the art will appreciate that in alternative embodiments, the image size in the Y-direction might be used.

FIG. 8 shows example image widths for wavelength components $\lambda_1$, $\lambda_2$, and $\lambda_3$ for the spectrograph 100 when the defocus-compensation feature is not used. As such, the detector 112 is located at a first position, $P_4$, for all three image width measurements. The image width ($W_1$) for $\lambda_1$ is about 150 microns wide, the image width ($W_1$) for $\lambda_2$ is about 240 microns wide, and the image width ($W_1$) for $\lambda_3$ is about 270 microns wide. Those skilled in the art will appreciate that any wavelengths of interest may be selected for analysis by the spectrograph 100.

FIG. 9 shows example image widths for the wavelength components $\lambda_1$, $\lambda_2$, and $\Delta_3$ for the spectrograph 100 described with respect to FIG. 8, but when the defocus-compensation feature is used. For the image width measurement at $\lambda_1$, the detector 112 is moved (e.g., by the adjustment device 114) to a position $P_3$ that is closer to the grating 108. The resulting image width ($W_2$) for $\lambda_1$ is about 50 microns. For the image width measurement at $\lambda_2$, the detector 112 is moved to a position $P_2$ relative to the grating 108. The resulting image width ($W_2$) for $\lambda_2$ is about 85 microns. For the image width measurement at $\lambda_3$, the detector 112 is moved to a position $P_1$ relative to the grating 108. The resulting image width ($W_2$) for $\lambda_3$ is about 80 microns. Those skilled in the art will appreciate that any wavelengths of interest may be selected for analysis by the spectrograph 100.

Figure 10:
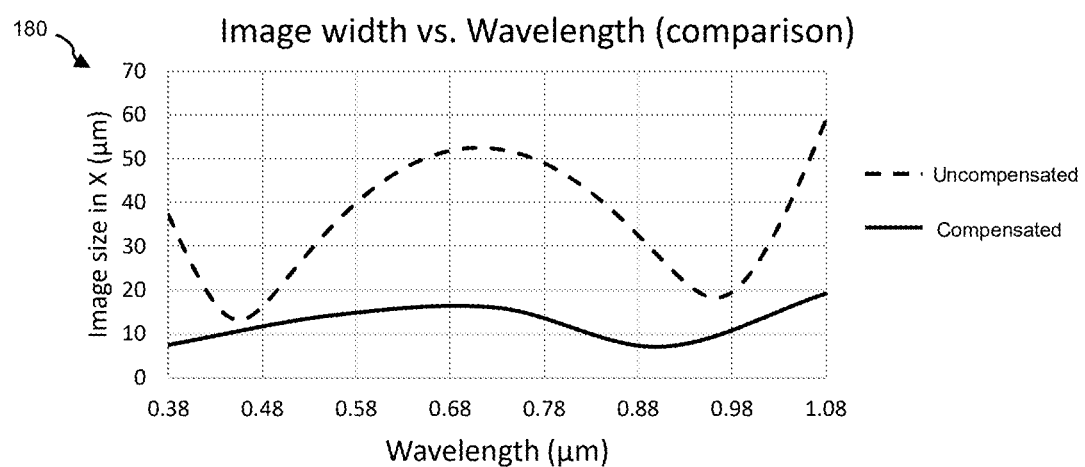
FIG. 10 shows a graph of image width as a function of wavelength for the high-resolution spectrograph shown in FIGS. 5 and 6 with and without defocus compensation.

FIG. 10 shows a plot of the image width (in microns) vs. wavelength (in microns) for an uncompensated spectrograph design (dashed line) vs defocus-compensated spectrograph design (solid line), showing an improvement in image width by as much as a factor of three. The amount of improvement in image width varies with wavelength for a number of reasons, including that optical aberration and defocusing effects can be wavelength-dependent. Those skilled in the art will appreciate that the defocus compensation feature of the spectrograph 100 may improve the image width by any amount, and that the magnitude of the improvement may not vary relative to or as a function of wavelength.

Figure 11:
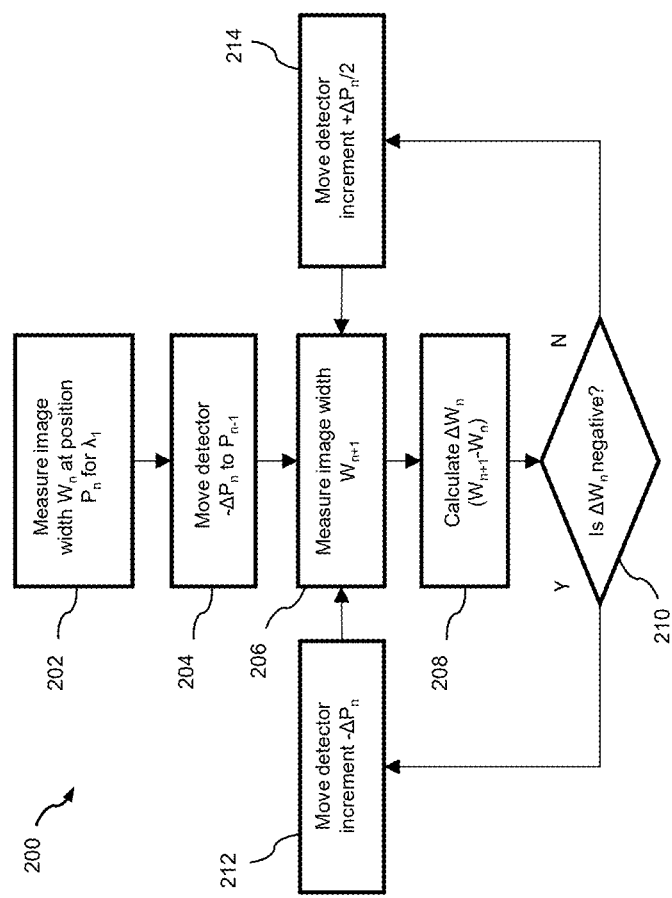
FIG. 11 shows a control sequence diagram for an embodiment of a method for optimizing spectrograph measurements.

FIG. 11 shows the steps of an example embodiment of a method of measuring at least one property of the diffracted optical signal 110 using the spectrograph 100 described above. This embodiment comprises a control sequence 200 operative to find the minimum image width of the diffracted optical signal 110 and the location of the minimum image width at multiple wavelengths of interest (also referred to herein as "the selected wavelengths", or "wavelength components"). As described above, due to various optical aberration effects, the location of optimum focus for different wavelength components of the diffracted optical signal 110 are located at different positions (e.g., optically upstream or downstream) along the direction of propagation of the diffracted optical signal 110. The control sequence 200 is an iterative control loop that is configured to converge on the minimum image width by measuring the image width at various incremental positions of the detector 112 and monitoring the image width data to detect changes in the image width and reversing the movement of the detector 112 if the image width increases.

The control sequence 200 starts with a first measurement step 202, measuring, with the optical detector 112 positioned at a first position $P_n$ relative to the optical detector 112, a first image width $W_n$ of a first wavelength component having a wavelength $\lambda_1$ of the diffracted optical signal 110. The next step is a first motion step 204, translating, with the adjustment device 114, the optical detector 112 an incremental step $-\lambda P_n$ to a second position $P_{n-1}$ relative to the grating 108.

The next step is a second measurement step 206, measuring, with the detector 112 positioned at the second position $P_{n-1}$ relative to the grating 108, a second image width $W_{n+1}$ of the first wavelength component of the diffracted optical signal 110. The next step is executing a calculation step 208, performed in the controller 120, calculating a first change in image width ($\Delta W_n$), by subtracting the first image width ($W_n$) from the second image width ($W_{n+1}$).

The calculation step 208 is followed by a logic step 210, determining whether the first change in image width ($\Delta W_n$) is negative (wherein the image width is decreasing) or positive (wherein the image width is increasing). If the first change in image width ($\Delta W_n$) is negative (the image width is getting smaller), the next step is a second motion step 212, translating the detector 112 an incremental step $-\Delta P_n$ to a third position $P_{n-2}$ relative to the grating 108. If the first change in image width ($\lambda W_n$) is positive (the image is getting larger), the next step is a third motion step 214, translating the detector 112 an incremental step $+\Delta P_n/2$ (in a direction away from the grating 108) to a fourth position $P_{n-3}$ relative to the grating 108. In this third motion step 214, the incremental step $\Delta P$ is halved as the control sequence begins to converge on a minimum image width.

After the third motion step 214, the measurement step 206, the calculation step 208, the logic step 210, and the motion step 212 (or motion step 214) are repeated until the control sequence 200 converges on a minimum value for the image width W that is then transmitted to the controller 120. Those skilled in the art will appreciate that the calculation and/or logic steps may be performed in the controllers 122, 124, or on board the detector 112 or the adjustment device 114.

The control sequence 200 as described above is an embodiment wherein the detector 112 undergoes a linear (both toward or away from the grating 108 or laterally with respect to the grating 108). In other embodiments, the control sequence 200 can be executed wherein the detector 112 undergoes changes in angular orientation (e.g., the changes in orientation shown in FIGS. 7A and 7B). In another embodiment, the control sequence 200 described above may be executed by changing the position or angular orientation of the grating 108 relative to the detector 112.

Figure 12:
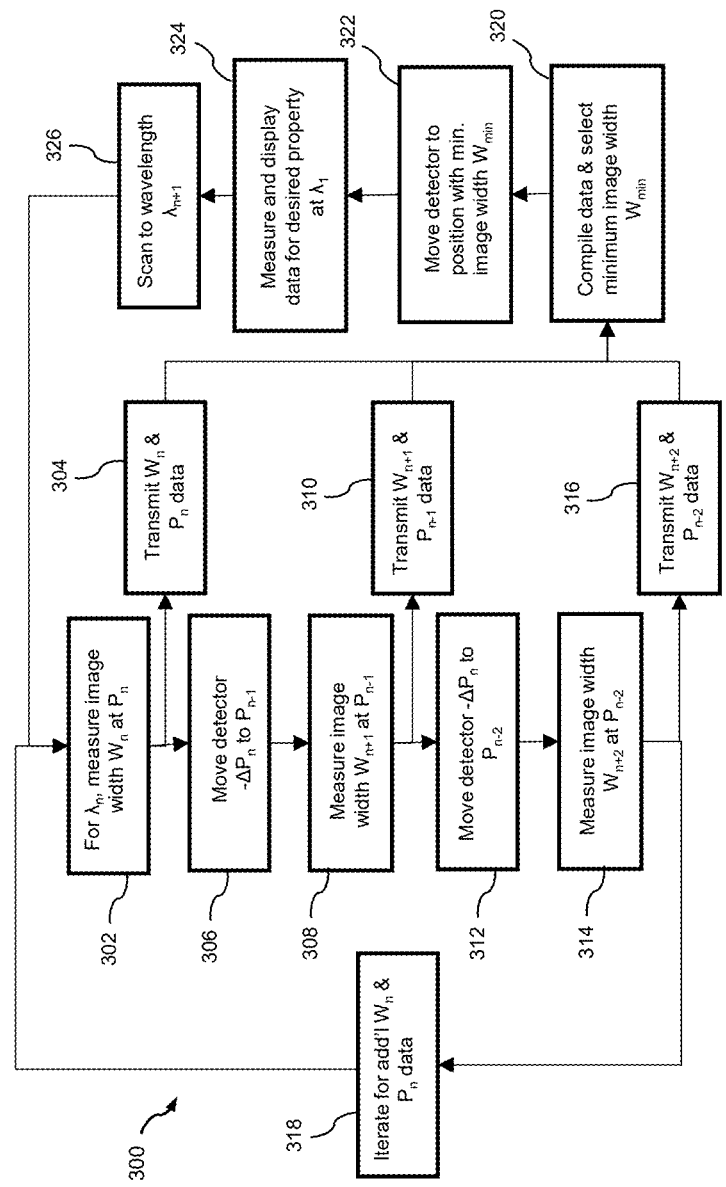
FIG. 12 shows a control sequence diagram for another embodiment of a method for optimizing spectrograph measurements.

FIG. 12 show the steps of an embodiment of a control sequence 300 used to find the minimum image width of the diffracted optical signal 110 and the location of the minimum image width at multiple wavelengths of interest (also referred to herein as "the selected wavelengths", or "wavelength components"). This embodiment of control sequence 300 is operative to translate (i.e., scan) the detector 112 (either toward or away from the grating 108 or laterally with respect to the grating 108) while capturing or recording data representative of the image width at each of multiple positions relative to the grating 108 and sending this data to the controller 120 for processing and analysis. In one embodiment, after a scan, the controller 120 selects the smallest image width data, moves the detector 112 to that position and records the image width data. This control sequence 300 is then repeated for all of the desired wavelengths or wavelength components.

The control sequence 300 starts with a first measurement step 302, measuring, with the optical detector 112 positioned at a first position $P_n$ relative to the grating 108, a first image width $W_n$ of the diffracted optical signal 110 at the wavelength component $\lambda_1$ (e.g., 450.00 nanometers). Then a data acquisition step 304 is performed, wherein the detector 112 transmits measurement data representative of the first image width $W_n$ to the controller 120 and the adjustment device 114 transmits measurement data representative of the first position $P_n$ to the motion controller 124. The next step is a first motion step 306 wherein the adjustment device 114 moves the detector 112 an incremental step $-\Delta P_n$ to a second position $P_{n-1}$ relative to the grating 108. The absolute value of the incremental steps ($\Delta P_n$) can be selected as desired or beneficial.

The next step is a second measurement step 308, measuring, with the optical detector 112 positioned at the second position $P_{n-1}$ relative to the optical detector (112), a second image width $W_{n+1}$ of the wavelength component $\lambda_1$. Then a data acquisition step 310 is performed, wherein the detector 112 transmits measurement data representative of the second image width $W_{n+1}$ to the controller 120 and the adjustment device 114 transmits measurement data representative of the second position $P_{n-1}$ to the motion controller 124. The next step is a second motion step 312 wherein the adjustment device 114 moves the detector 112 an incremental step $-\Delta P_n$ to a third position $P_{n-2}$ relative to the grating 108.

The next step is a third measurement step 314, measuring, with the optical detector 112 positioned at the third position $P_{n-2}$ relative to the optical detector 112, a third image width $W_{n+2}$ of the wavelength component $\lambda_1$. Then, a third data acquisition step 316 is performed, wherein the detector 112 transmits measurement data representative of the third image width $W_{n+2}$ to the controller 120 and the adjustment device 114 transmits measurement data representative of the third position $P_{n-2}$ to the motion controller 124.

While the process outlined above describes three measurement steps and two motion steps, the process can involve a large number of measurement steps and motion steps in order to gather sufficient data for processing to achieve the ensure that the location of minimum image width is found. To do this, an iteration step 318 is performed to repeat the measurement and motion steps to gather additional data.

As each data acquisition step 304, 310, 316 is performed, a compilation step 320 is performed in the instrument controller 120 that saves the sequential position data $P_n$ with its associated sequential image width data $W_n$ for future processing. For example, in order to position the detector 112 at the point relative to the grating 108 where the image width of the wavelength component $\lambda_1$ is at a minimum, image width data is created for each movement increment performed by the adjustment device 114. After all of the data is compiled, the controller 120 can process the data to find the position of the detector 112 where the image width is smallest, then, in a third motion step 322 commands the adjustment device 114 to move the detector 112 to that position and perform a final measurement step 324 (e.g., optical power or other performance parameter as selected by the operator or controller).

The steps 302 through 324 above are for measurements of a selected wavelength $\lambda_1$ or wavelength component $\lambda_1$ (e.g., 450.00 nanometers) of the diffracted optical signal 110. The control sequence 300 can then be repeated (e.g., as commanded by the controller 120 or a system operator operating the spectrograph 100) as a step 326 for another wavelength component $\lambda_2$ (e.g., 450.15 nanometers) and so on for a sufficient number of wavelength components to characterize the incident optical signal 106 to the desired degree of precision. The end result can be a display of the intensity of light as a function of wavelength (i.e., a spectroscopy or spectrograph plot of optical power over the spectrum of interest).

The embodiments described above are illustrative of a spectrograph having the capability to change the position of its detector to achieve optical results over a range of wavelengths. Those skilled in the art will appreciate that the spectrograph configurations described above may be expanded to enable a variety of other performance advantages, without departing from the spirit of the foregoing disclosure.

The foregoing is illustrative of embodiments and examples of the invention, and is not to be construed as limiting thereof. Although a few specific embodiments and examples have been described with reference to the drawings, those skilled in the art will readily appreciate that many modifications to the disclosed embodiments and examples, as well as other embodiments, are possible without materially departing from the novel teachings and advantages of the invention. Accordingly, all such modifications to the subject matter described herein are intended to be included within the scope of the invention as defined in the claims. For example, skilled persons will appreciate that the subject matter of any sentence, paragraph, example or embodiment can be combined with subject matter of some or all of the other sentences, paragraphs, examples or embodiments, except where such combinations are mutually exclusive. The scope of the present invention should, therefore, be determined by the following claims, with equivalents of the claims to be included therein.

What is claimed is:

1. A method of analyzing an incident optical signal, comprising:
    providing at least one dispersive optical element operative to reflect the incident optical signal as a diffracted optical signal;
    providing at least one detector configured to measure one or more properties of the diffracted optical signal;
    providing at least one adjustment device operative to change a position of the at least one detector relative to the at least one dispersive optical element;
    providing at least one controller configured to receive measurement data representative of the one or more properties of the diffracted optical signal from the at least one detector, and to command the at least one adjustment device to position the at least one detector relative to the at least one dispersive optical element;
    measuring, with the at least one detector, at least one of the one or more properties of the diffracted optical signal;
    adjusting the position of the detector relative to the at least one dispersive optical element with the at least one adjustment device until an optimum value of the at least one of the one or more properties of the diffracted optical signal is reached.

2. The method of claim 1, wherein one of the one or more properties of the diffracted optical signal is an optical power of at least one first wavelength component ($\lambda_1$).

3. The method of claim 1, wherein one of the one or more properties of the diffracted optical signal is an optical power of at least one second wavelength component ($\lambda_2$).

4. The method of claim 1, wherein one of the one or more properties of the diffracted optical signal is an optical power of at least one third wavelength component ($\lambda_3$).

5. The method of claim 1, wherein one of the one or more properties of the diffracted optical signal is an optical power of at least one fourth wavelength component ($\lambda_4$).

6. The method of claim 1, wherein one of the one or more properties of the diffracted optical signal is an optical power of at least one fifth wavelength component ($\lambda_5$).

7. A method of analyzing an incident optical signal, comprising:
    providing at least one dispersive optical element operative to reflect the incident optical signal as a diffracted optical signal;
    providing at least one detector configured to measure one or more properties of the diffracted optical signal, wherein one of the one or more properties of the diffracted optical signal is an image width ($W_n$) of one or more wavelength components ($\lambda_n$);
    providing at least one adjustment device operative to change a position of the at least one detector relative to the at least one dispersive optical element;
    providing at least one controller configured to receive measurement data representative of the image width ($W_n$) of a first wavelength component ($\lambda 1$) from the at least one detector, and to command the at least one adjustment device to adjust the position of the at least one detector relative to the at least one dispersive optical element;
    executing a control sequence, comprising:
        in a first measurement step, measuring a first image width ($W_1$) of the first wavelength component ($\lambda_1$), with the at least one detector positioned at a first position ($P_1$) relative to the at least one dispersive optical element;
        in a first motion step, positioning, with the at least one adjustment device, the at least one detector at a second position ($P_0$) relative to the at least one dispersive optical element;
        in a second measurement step, measuring a second image width ($W_2$) of the first wavelength component ($\lambda_1$) with the at least one detector positioned at the second position ($P_0$) relative to at least one dispersive optical element;
        in a comparison step comparing, in the at least one controller, the first image width ($W_1$) to the second image width ($W_2$) to determine a first change in image width ($\Delta W_1$);
        if the first change in image width ($\Delta W_1$) is positive, in a third motion step, positioning, with the at least one adjustment device, the at least one detector an incremental step ($-\Delta P_1$) closer to the at least one dispersive optical element;
        if the first change in image width ($\Delta W_1$) is negative, in a second motion step, positioning, with the at least one adjustment device, the at least one detector the same incremental step ($-\Delta P_1$) closer to the at least one dispersive optical element;
        iterating the control sequence until a minimum image width ($W_{min}$) is reached; and
        outputting data representative of the minimum image width ($W_{min}$) to at least one display.

8. The method of claim 7, further comprising repeating the control sequence for a second wavelength component ($\lambda_2$) of the diffracted optical signal.

9. The method of claim 7, further comprising repeating the control sequence for a third wavelength component ($\lambda_3$) of the diffracted optical signal.

10. The method of claim 7, further comprising repeating the control sequence for a fourth wavelength component ($\lambda_4$) of the diffracted optical signal.

11. The method of claim 7, further comprising repeating the control sequence for a fifth wavelength component ($\lambda_5$) of the diffracted optical signal.

12. The method of claim 7, further comprising repeating the control sequence for a sixth wavelength component ($\lambda_6$) of the diffracted optical signal.

13. A method of analyzing an incident optical signal, comprising:

providing at least one dispersive optical element operative to diffract the incident optical signal as a diffracted optical signal;

providing at least one detector configured to measure one or more properties of the diffracted optical signal wherein one of the one or more properties of the diffracted optical signal is an image width ($W_n$) of one or more wavelength components ($\lambda_n$);

providing an adjustment device operative to change a position of the at least one detector relative to the at least one dispersive optical element;

providing at least one detector controller configured to receive measurement data representative of at least one property of the diffracted optical signal from the at least one detector;

providing at least one motion controller configured to command the at least one adjustment device to adjust the position of the at least one detector relative to the at least one dispersive optical element;

executing a control sequence, comprising:

in a first measurement step, measuring, with the at least one detector positioned at a first position ($P_n$) relative to at least one dispersive optical element, a first image width ($W_n$) of a first wavelength component ($\lambda 1$);

in a first data acquisition step, transmitting measurement data representative of the second image width ($W_n$) from the at least one detector to the at least one detector controller and transmitting detector data representative of the first position ($P_n$) relative to at least one adjustment device to the at least one motion controller;

in a first motion step, positioning, with the adjustment device, the detector a first incremental step ($-\Delta P_n$) to a second position ($P_{n-1}$) relative to the at least one dispersive optical element;

in a second measurement step, measuring, with the at least one detector positioned at the second position ($P_{n-1}$) relative to at least one dispersive optical element, a second image width ($W_{n+1}$) of the first wavelength component ($\lambda_1$);

in a second data acquisition step, transmitting measurement data representative of the second image width ($W_{n+1}$) from the at least one detector to the at least one detector controller and transmitting detector position data representative of the second position ($P_{n-1}$) relative to the at least one adjustment device to the at least one motion controller;

in a second motion step, positioning, with the at least one adjustment device, the at least one detector a second incremental step ($-\Delta P_n$) to a third position ($P_{n-2}$) relative to the at least one dispersive optical element;

in a third measurement step, measuring, with the at least one detector positioned at the third position ($P_{n-2}$) relative to the at least one dispersive optical element, a second image width ($W_{n+2}$) of the first wavelength component ($\lambda_1$);

in a third data acquisition step, transmitting measurement data representative of the third image width ($W_{n+2}$) from the at least one detector to the at least one detector controller and transmitting detector position data representative of the third position ($P_{n-2}$) of the at least one detector relative to the at least one adjustment device to the at least one motion controller;

in a compilation step, compiling in at least one controller the image width data and the detector position data from sequential data acquisition steps, and selecting a smallest image width ($W_{min}$) of the compiled image width data;

positioning the at least one detector at a distance ($R_{min}$) associated with the smallest image width ($W_{min}$).

14. The method of claim 13, further comprising repeating the control sequence for a second wavelength component ($\lambda_2$) of the diffracted optical signal.

15. The method of claim 13, further comprising repeating the control sequence for a third wavelength component ($\lambda_3$) of the diffracted optical signal.

16. The method of claim 13, further comprising repeating the control sequence for a fourth wavelength component ($\lambda_4$) of the diffracted optical signal.

17. The method of claim 13, further comprising repeating the control sequence for a fifth wavelength component ($\lambda_5$) of the diffracted optical signal.

* * * * *